United States Patent Office 2,875,245
Patented Feb. 24, 1959

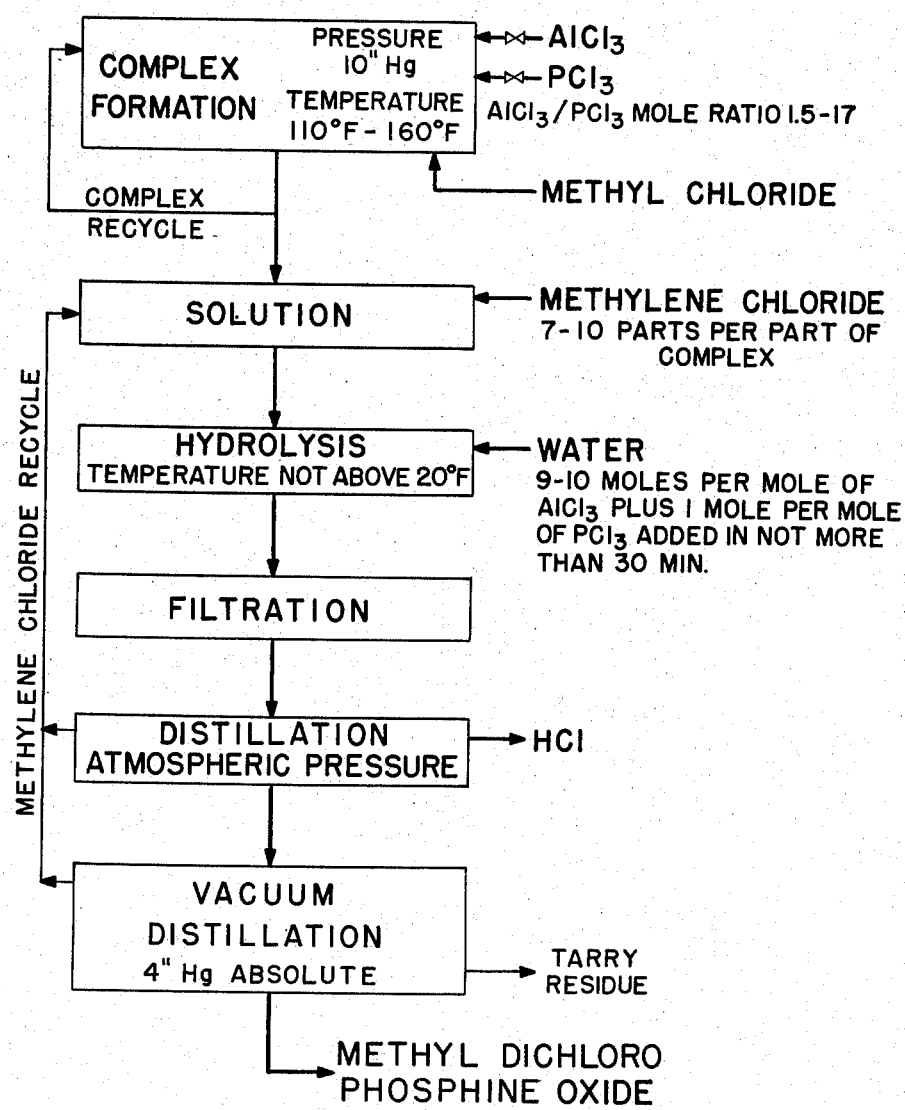

2,875,245
PRODUCTION OF METHYL DICHLORO PHOSPHINE OXIDE

Travis P. Hignett, Lawrence B. Hein, and Alvin B. Phillips, Sheffield, and Ronald D. Young, Florence, Ala., assignors to Tennessee Valley Authority, a corporation of the United States Application September 26, 1955, Serial No. 536,790

3 Claims. (Cl. 260—543)

(Granted under Title 35, U. S. Code (1952), sec. 266)

The invention herein described may be manufactured and used by or for the Government for governmental purposes without the payment to us of any royalty therefor.

This invention is an improved process for the manufacture of methyl dichloro phosphine oxide.

Prior to our invention it had been known that methyl dichloro phosphine oxide could be prepared by a series of process steps beginning with bubbling methyl chloride through a slurry consisting of anhydrous aluminum chloride suspended in phosphorus trichloride. It was known that this reaction resulted in the formation of either of two complex reaction products, depending on the proportion of aluminum chloride present. The formation of these reaction products may be represented by the following equations:

(1) $CH_3Cl + PCl_3 + AlCl_3 \rightarrow CH_3Cl \cdot PCl_3 \cdot AlCl_3$
(2) $CH_3Cl + PCl_3 + 2AlCl_3 \rightarrow CH_3Cl \cdot PCl_3 \cdot 2AlCl_3$ The product formed in reaction (1) above is a crystalline solid. That formed in reaction (2) is a thick, viscous liquid.

The product of reaction (1) being solid was very hard to handle in succeeding steps. That of reaction (2) was quite expensive due to the quantity of aluminum chloride required. The reactions were also known to be slow and time-consuming.

It was known that the products of either Equation (1) or (2) above could be hydrolyzed to yield methyl dichloro phosphine oxide. The yield, however, was quite low, about 50 to 60 percent of the theoretical being ordinarily obtained. Hydrolysis also resulted in the formation of sticky precipitates which were hard to separate from the solutions. Difficult operation, plugging of equipment, and health hazards to operators resulted. The materials handled in this process are also extremely corrosive, and apparatus expense was very high.

It is an object of this invention to provide a process for the production of methyl dichloro phosphine oxide whereby increased yields of product are received. Another object is to provide such process wherein the physical properties of the slurries produced are such that they are easily handled in succeeding process steps. Still another object is to provide such process wherein corrosion and apparatus expense are reduced.

Another object is to provide a process of this type which can be carried out either batchwise or continuously. Other objects and advantages will become apparent from the following description.

We have found that the initial reaction is speeded up and the complex reaction products are obtained in the form of a fluid slurry provided that methyl chloride is introduced into a slurry of anhydrous aluminum chloride in phosphorus trichloride wherein the mole ratio of $AlCl_3/PCl_3$ is in the range from 1.5 to 1.7 and the reaction is carried out at temperatures in the range from 110° F. to 160° F. and under gauge pressure of about 10 inches of mercury. Mole ratios of $AlCl_3/PCl_3$ above 1.7 are operable but are wasteful of aluminum trichloride. For economic reasons we prefer to operate at n $AlCl_3/PCl_3$ mole ratio of about 1.5 as this gives a fluid slurry under the conditions given above.

We have also found that the yield of methyl dichloro phosphine oxide is increased and the formation of a difficulty separable precipitate is eliminated provided the fluid slurry of reaction products is dissolved in from 7 to 10 times its weight of methylene chloride, the resulting solution is maintained at a temperature not above 20° F., while the complex reaction products are hydrolyzed by introduction of 9 to 10 moles of water per mole of aluminum chloride plus 1 mole of water per mole of phosphorus trichloride contained in these reaction products. This addition of water must be completed in not more than 30 minutes if high yields are to be obtained.

We have also found that an end product of high purity is obtained and corrosion of separation equipment is minimized when the hydrolyzate obtained as described above is first distilled at atmospheric pressure and is then distilled under reduced pressure of about 4 inches of mercury absolute. In the atmospheric distillation methylene chloride is distilled off in sufficient purity to be recycled to the solution-forming step. In the vacuum distillation residual methylene chloride is distilled off and this is followed at a large temperature interval by a distillate of methyl dichloro phosphine oxide of high purity. A tarry residue is left as a bottoms product.

The attached drawing is a flow sheet illustrating principles of our invention.

With reference thereto anhydrous aluminum chloride and phosphorus trichloride are fed to a complex formation step in such proportions that a slurry of solid anhydrous aluminum chloride suspended in liquid phosphorus trichloride having an $AlCl_3/PCl_3$ mole ratio of 1.5 to 1.7 results. We have found that the rate of gas absorption in this step is increased noticeably by seeding the slurry with a small amount of recycled complex reaction products. A slight excess of gaseous methyl chloride is bubbled through this slurry, which results in converting the slurry into a slurry of solid

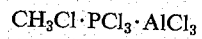

suspended in liquid $CH_3Cl \cdot PCl_3 \cdot 2AlCl_3$. This reaction is conducted under gauge pressure of about 10 inches of mercury and at a temperature of 110° F. to 160° F. The reaction is exothermic and cooling must be used, but care should be taken that cooling is not so vigorous that temperatures below 110° F. result. When carried out in this manner an easily handled slurry results.

Many types of apparatus for contacting gas with liquid may be suitable for this reaction, but we have found an apparatus similar to a three plate section of a fractionation column, with a cooling jacket, downcomers and bubble caps and an agitator on each plate is very convenient for this step.

The slurry of complex reaction products is then dissolved in from 7 to 10 parts by weight of methylene chloride. Prior to our invention an attempt had been made to hydrolyze these complex reaction products in 3 parts by weight of methylene chloride but this results in a suspension and not in a true solution. We attribute a part of our increased yield to the fact that we use at least 7 parts by weight of methylene chloride, i. e., enough to dissolve the complex reaction products completely.

The resulting solution is then passed to a hydrolysis step. Here it is held at a temperature not higher than 20° F. while 9 to 10 moles of water per mole of aluminum chloride plus 1 mole of water per mole of phosphorus trichloride are introduced. This reaction is strongly exothermic and vigorous cooling is necessary. Coils of pipe, in which refrigerated methylene chloride is circulated, immersed in the liquid, or other highly efficient heat transfer equipment are necessary. The water may be added as ice pellets, or as a spray or a stream of liquid without effect on the yield so long as the cooling is sufficiently efficient. We have found that water is as effective as acid in this hydrolysis. We have also found that it is important that all water required for hydrolysis be introduced in a period of time not exceeding 30 minutes. A hard glassy precipitate forms on cooling surfaces and interferes with heat transfer when the water is added more slowly, but if all the water is added in not more than 30 minutes, this precipitate does not form. We attribute a part of the increased yield to rapid addition of water, avoiding this troublesome precipitate.

When the hydrolysis is carried out in this manner a granular precipitate of hydrated aluminum chloride is produced. This precipitate is not sticky, but is in a form easily separated from the residual solution.

The hydrolyzate containing hydrated aluminum chloride in suspension is then passed to a separation step. We used a centrifugal filter equipped with fiberglass filter cloth as apparatus for this step and obtained excellent filtration rates. The hydrated aluminum chloride separated at this point is of sufficient purity that it can be calcined, and the calcine can be chlorinated to produce fresh anhydrous aluminum chloride that can be recycled to the complex-formation step.

The liquid residue from which hydrated aluminum chloride has been separated is then passed to a distillation step. Here it is subjected to distillation at atmospheric pressure and the greater part of the methylene chloride present is distilled over and is condensed. This methylene chloride is of sufficient purity to be recycled to the solution step without further treatment. An appreciable amount of hydrogen chloride also passes over in this step as a noncondensable gas and may be conducted to scrubbers or neutralizers to avoid nuisance. If large quantities of methyl dichloro phosphine oxide are produced this quantity of HCl may be large enough to warrant special recovery equipment.

The still residue is then subjected to distillation under vacuum, pressures of about 4 inches of mercury, absolute, being suitable for this step. Residual methylene chloride first distills over in this step and may be recycled. After a considerable temperature interval methyl dichloro phosphine oxide distills over in high purity. The still residue is a tarry liquid and is discarded. This method of separation not only gives a product of high purity but reduces corrosion of equipment.

It will be seen that the process described above can be carried out either batchwise or continuously. For continuous operation it may be necessary to conduct the complex-formation step in two or more stages with countercurrent flow of slurry and methyl chloride, as is inherent in the apparatus mentioned above. It may also be necessary to use more than one tank for the preparation of methylene chloride solution, so that solution can be fed to succeeding steps from one tank while the complex is dissolving in another. Surge tanks may also be necessary to smooth out the rate of flow in various steps, and other arrangements for economy and convenience, but such things are within the skill of the average engineer.

Our process has several advantages over the prior art. In the complex-formation step we speed up the reaction and obtain an easily handled slurry by recycling a small amount of previously formed complex, and maintaining the temperature, pressure and $AlCl_3/PCl_3$ mole ratios within certain critical limits. We increase the yield of final product and obtain an easily separated hydrated aluminum chloride precipitate by hydrolyzing in solution, rather than in suspension, with water added at critical rate and quantity while maintaining a critically low temperature. We recover methylene chloride of sufficient purity for recycling, obtain an end product of high purity, and decrease corrosion of equipment by our method of distillation.

The manufacture of methyl dichloro phosphine oxide was studied extensively in both bench-scale and pilot-plant work. In the bench-scale work it was found that an $AlCl_3/PCl_3$ mole ratio of 1.5 in the complex-formation step resulted in a slurry that was only slightly viscous and that the reaction was speeded up by a pressure of 7 to 10 inches Hg. This 1.5 mole ratio was used in all pilot-plant work.

This step was carried out in pilot-plant equipment similar to a fractionation column of three plates, equipped with bubble caps, down-comers, and an agitator on each plate. The temperature was varied over the entire range from 110° to 160° F. There was no significant difference in the rate of gas absorption or yield when the temperature was varied within this range, although the viscosity of the slurry and vaporization of methyl chloride were affected. We obtained best results in this particular type of equipment when the temperature of reactants on the top plate was held at about 110° F. and that on the lower plate at or near 160° F. thus minimizing loss of methyl chloride and obtaining maximum fluidity of the slurry. The speed of complex formation was found to be increased significantly by seeding the reaction mixture with about 15 percent or so of complex slurry previously formed. This was found to reduce the time required for complex formation by about 25 to 30 percent.

Small-scale work had shown that much better hydrolysis was obtained when the complex was in true solution in methylene chloride rather than in suspension and that 7 to 10 parts by weight of methylene chloride per part of complex were necessary to ensure solution. This principle was carried over into pilot-plant work and the complex slurry was fed alternately into two tanks equipped with agitators, one tank being on stream at one time.

Bench-scale work had shown that the maximum over-all yield of methyl dichloro phosphine oxide was obtained when hydrolysis of the dissolved complex was performed by adding all water required in not more than 30 minutes. At addition rates slower than this the yield falls off sharply and is only about 30 percent of the theoretical when the required water is added during a period of two hours. This 30-minute-or-less rate of addition of water was used in pilot-plant work and resulted in a yield of 72 to 78 percent of the theoretical with an average of 76 percent, producing 300 pounds of methyl dichloro phosphine oxide per day.

In pilot-plant work it was found that at low levels of hydration a hard transparent percipitate formed on the surfaces of cooling coils, thus greatly interfering with heat transfer. This precipitate did not form when 9 to 10 moles of water per mole of $AlCl_3$ plus 1 mole per mole of $PCl_3$ were added in a period of not more than 30 minutes. At lower levels of hydration or at temperatures above 20° F. the precipitate of hydrated aluminum chloride formed during hydrolysis was soft, sticky or gelatinous and was very difficult to separate from solution.

Heat transfer during hydrolysis is a major problem in this process. This problem was solved in the pilot plant by utilizing two tanks in a cycle. Complex solution and water were continuously introduced into the first of these tanks. Hydrolysis slurry was continuously pumped from the first tank through the second and back to the first. Both tanks were equipped with agitators and contained a large number of coils through which strongly refrigerated methylene chloride was circulated. Thus sufficient heat transfer surface was provided to hold the temperature of the hydrolysis slurry below 20° F. Hydrolyzate was continuously withdrawn from the second tank. Under these conditions the hydrated aluminum chloride formed was granular and was easily filtered from the solution.

The solution was then filtered on a rotary filter equipped with a fiberglass filter cloth. The filtrate was then passed to a still and was distilled under atmospheric pressure. In all cases the methylene chloride recovered as distillate was sufficiently pure to be recycled to the solution formation step. The wide separation of boiling points of methylene chloride and methyl dichloro phosphine oxide (104° and 335° F., respectively) and the purity of the distillate recovered in this step suggest the possibility of flash distillation for recovery of the bulk of the solvent, but this was not tried.

The still residue was then passed to a second still and was distilled under pressure of about 4 inches of Hg, absolute. Higher vacuums also were tried but no significant advantages were obtained. At 4 inches of Hg the product obtained was of high purity, and corrosion of equipment was minimized.

The following example illustrates our invention:

*Example*

The complex formation step was carried out in pilot-plant equipment similar to a fractionation column of three plates, equipped with bubble caps, downcomers and an agitator on each plate. An $AlCl_3/PCl_3$ mole ratio of 1.5 was used. We obtained best results when the temperature of the reactants on the top plate was held at about 110° F. and that on the lower plate at or near 160° F., thus minimizing loss of methyl chloride and obtaining maximum fluidity of the slurry. The speed of complex formation was increased by seeding the reaction mixture with about 15 percent of complex previously formed and recycled. This was found to reduce the time required for complex formation by about 25 to 30 percent.

The complex was dissolved in from 7 to 10 parts by weight of methylene chloride. This was accomplished by feeding the complex slurry and methylene chloride alternately into two tanks equipped with agitators, one tank being on stream at one time.

The dissolved complex was passed to a hydrolysis step and was hydrolyzed with 9 to 10 moles of water per mole of aluminum chloride plus 1 mole of water per mole of phosphorus trichloride added in a period of not more than 30 minutes. Yields of 72 to 78 percent of the theoretical were obtained when producing 300 pounds of methyl dichloro phosphine oxide per day. No hard, transparent precipitate formed on the surface of cooling coils.

During hydrolysis the temperature of the solution was maintained at a point not above 20° F. This was accomplished by utilizing two tanks in a cycle. Complex solution and water were continuously introduced into the first of these tanks. Hydrolysis slurry was pumped continuously from the first tank, through the second and back to the first. Both tanks contained a large number of coils through which strongly refrigerated methylene chloride was circulated. Hydrolyzate was withdrawn continuously from the second tank. The hydrated aluminum chloride formed was granular and easily filterable.

The solution was then filtered on a rotary filter equipped with a fiberglass filter cloth. The filtrate was passed to a still and distilled under atmospheric pressure. Methyl chloride was recovered as distillate and was recycled to the solution formation step. The still residue was passed to a second still and was distilled under a pressure of about 4 inches of mercury, absolute. The product obtained was of high purity, and corrosion of equipment was minimized.

We claim as our invention:

1. In a process for the production of methyl dichloro phosphine oxide wherein methyl chloride is introduced into a slurry of anhydrous aluminum chloride in phosphorus trichloride, a complex reaction product is formed, this complex reaction product is hydrolyzed, hydrated aluminum chloride is separated from the resulting slurry and methyl dichloro phosphine is recovered from the resulting liquid residue, that improvement which comprises introducing methyl chloride into a slurry of anhydrous aluminum chloride in phosphorus trichloride wherein the mole ratio $AlCl_3/PCl_3$ is in the range from 1.5 to 1.7; maintaining the slurry under gauge pressure of about 10 inches of mercury and in a temperature gradient from about 110° F. to about 160° F. until a pumpable slurry consisting essentially of solid

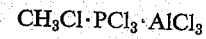

$$CH_3Cl \cdot PCl_3 \cdot AlCl_3$$

suspended in liquid $CH_3Cl \cdot PCl_3 \cdot 2AlCl_3$ is formed; dissolving complex product slurry in 7 to 10 times its weight of methylene chloride; maintaining the temperature of the solution at not more than 20° F. while 9 to 10 moles of water per mole of aluminum chloride plus one mole of water per mole of phosphorus trichloride are introduced in a period of time not exceeding 30 minutes and the dissolved complexes are hydrolyzed; and recovering methyl dichloro phosphine oxide from the resulting solution.

2. In a process for the production of methyl dichloro phosphine oxide wherein methyl chloride is introduced into a slurry of anhydrous aluminum chloride in phosphorus trichloride, a complex reaction product is formed, this complex reaction product is hydrolyzed, hydrated aluminum chloride is separated from the resulting slurry and methyl dichloro phosphine is recovered from the resulting liquid residue, that improvement which comprises introducing methyl chloride into a slurry of anhydrous aluminum chloride in phosphorus trichloride wherein the mole ratio $AlCl_3/PCl_3$ is in the range from 1.5 to 1.7; maintaining the slurry under gauge pressure of about 10 inches of mercury and in a temperature gradient from about 110° F. to about 160° F. until a pumpable slurry consisting essentially of solid

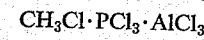

$$CH_3Cl \cdot PCl_3 \cdot AlCl_3$$

suspended in liquid $CH_3Cl \cdot PCl_3 \cdot 2AlCl_3$ is formed; seeding the slurry by introducing a small amount of complex reaction product slurry previously formed; dissolving complex product slurry in 7 to 10 times its weight of methylene chloride; maintaining the temperature of the solution at not more than 20° F. while 9 to 10 moles of water per mole of aluminum chloride plus one mole of water per mole of phosphorus trichloride are introduced in a period of time not exceeding 30 minutes and the dissolved complexes are hydrolyzed; and recovering methyl dichloro phosphine oxide from the resulting solution.

3. In a process for the production of methyl dichloro phosphine oxide wherein methyl chloride is introduced into a slurry of anhydrous aluminum chloride in phosphorus trichloride, a complex reaction product is formed, this complex reaction product is hydrolyzed, hydrated aluminum chloride is separated from the resulting slurry and methyl dichloro phosphine is recovered from the resulting liquid residue, that improvement which comprises introducing methyl chloride into a slurry of anhydrous aluminum chloride in phosphorus trichloride wherein the mole ratio $AlCl_3/PCl_3$ is in the range from 1.5 to 1.7; maintaining the slurry under gauge pressure of about 10 inches of mercury and in a temperature gradient from about 110° to about 160° F. until a pumpable slurry consisting essentially of solid

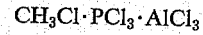

$$CH_3Cl \cdot PCl_3 \cdot AlCl_3$$

suspended in liquid $CH_3Cl \cdot PCl_3 \cdot 2AlCl_3$ is formed; dissolving complex product slurry in 7 to 10 times its weight of methylene chloride; maintaining the temperature of the solution at not more than 20° F. while 9 to 10 moles of water per mole of aluminum chloride plus one mole of water per mole of phosphorus trichloride are introduced in a period of time not exceeding 30 minutes and the dissolved complexes are hydrolyzed; filtering hydrated aluminum chloride from the resulting solution; distilling off the greater part of the methylene chloride contained in the solution at atmospheric pressure; recycling the resulting methylene chloride distillate to the above mentioned solution step; distilling the residue from the first distillation step under pressure of about 4 inches of mercury, absolute; and recovering a distillate of methyl dichloro phosphine oxide of high purity.

References Cited in the file of this patent

UNITED STATES PATENTS 2,744,132     Clay                 May 1, 1956

OTHER REFERENCES

Clay: Journal of Organic Chemistry, vol. 16, 1951, pages 892–4.